US010662285B2

(12) United States Patent
Okimoto et al.

(10) Patent No.: US 10,662,285 B2
(45) Date of Patent: May 26, 2020

(54) POLYESTER RESIN COMPOSITION

(71) Applicants: DAIWA CAN COMPANY, Tokyo (JP); Bell Polyester Products, Inc., Yamaguchi (JP)

(72) Inventors: Masaya Okimoto, Yamaguchi (JP); Keita Katsuma, Yamaguchi (JP); Hideaki Tomura, Yamaguchi (JP)

(73) Assignees: DAIWA CAN COMPANY, Tokyo (JP); Bell Polyester Products, Inc., Yamaguchi (JP)

(*) Notice: Subject to any disclaimer, the term of this patent is extended or adjusted under 35 U.S.C. 154(b) by 26 days.

(21) Appl. No.: 16/074,949

(22) PCT Filed: Feb. 3, 2016

(86) PCT No.: PCT/JP2016/053194
§ 371 (c)(1),
(2) Date: Aug. 2, 2018

(87) PCT Pub. No.: WO2017/134767
PCT Pub. Date: Aug. 10, 2017

(65) Prior Publication Data
US 2019/0040193 A1    Feb. 7, 2019

(51) Int. Cl.
C08G 63/199    (2006.01)
C08G 63/685    (2006.01)
C08L 67/02     (2006.01)
C08G 63/553    (2006.01)

(52) U.S. Cl.
CPC ....... *C08G 63/6856* (2013.01); *C08G 63/199* (2013.01); *C08G 63/553* (2013.01); *C08L 67/02* (2013.01)

(58) Field of Classification Search
USPC ........................ 528/290, 291, 292
See application file for complete search history.

(56) References Cited

U.S. PATENT DOCUMENTS 2,901,466 A * 8/1959 Smith .................. C08G 63/80
528/288
4,045,431 A * 8/1977 Fagerburg .............. C08G 63/46
528/295.3

| | | | |
|---|---|---|---|
| 2008/0145775 A1 | 6/2008 | Vijayendran |
| 2009/0011162 A1 | 1/2009 | Ohashi |
| 2009/0105377 A1 | 4/2009 | Vijayendran |
| 2010/0112250 A1 | 5/2010 | Shelby |
| 2010/0112251 A1 | 5/2010 | Shelby |
| 2011/0195233 A1 | 8/2011 | Vijayendran |
| 2012/0136116 A1 | 5/2012 | Vijayendran |

FOREIGN PATENT DOCUMENTS

| | | |
|---|---|---|
| JP | S5272799 | 6/1977 |
| JP | 2000302888 A | 10/2000 |
| JP | 3270185 B2 | 4/2002 |
| JP | 2002363271 A | 12/2002 |
| JP | 2008150442 A | 7/2008 |
| JP | 2008533290 A | 8/2008 |
| JP | 4764054 B2 | 8/2011 |
| JP | 2012507593 A | 3/2012 |
| JP | 2015147830 A2 | 8/2015 |
| WO | 2006088212 A1 | 8/2006 |

OTHER PUBLICATIONS

Montgomery, Steven et al., "Thermally Stable UV Crosslinkable Copolyesters: Synthesis, Crosslinking and Characterization of Poly(1,4-cyclohexylenedimethylene—1,4-cyclohexane dicarboxylate-co-4,4'-stilbene dicarboxylate)", Macromolecules, 2010, p. 5238-5244, vol. 43 No. 12, American Chemical Society, United States.
International Search Report dated Mar. 29, 2016 filed in PCT/JP2016/053194.

* cited by examiner

*Primary Examiner* — Terressa Boykin
(74) *Attorney, Agent, or Firm* — Rankin, Hill & Clark LLP

(57) ABSTRACT

The present invention provides a polyester resin composition excellent in transparency and flexibility, high in heat resistance, undergoes the bleeding-out of an oligomer at a reduced level, and can be formed into a formed or molded article or pellets that are rarely agglutinated. A polyester resin composition includes a polyester resin, made by a polymerization reaction of a dicarboxylic acid component containing (a) 75 to 98 mol% of an alicyclic dicarboxylic acid, preferably having 5 to 30 carbon atoms, and (b) 2 to 25 mol% of a dimer acid, preferably having 36 or 44 carbon atoms, with (c) a diol component containing 75 mol% or more of an alicyclic diol. The proportion of the trans-form relative to the total amount of the trans-form and the cis-form of the alicyclic dicarboxylic acid unit contained in the polyester resin composition is desirably 80% or more.

4 Claims, No Drawings

POLYESTER RESIN COMPOSITION

FIELD OF THE INVENTION

The present invention relates to a polyester resin composition for use as various forming or molding materials, and in particular, a polyester resin composition has excellent transparency and flexibility and high heat resistance, and undergoes the bleeding-out of the oligomer at a reduced level and additionally, in which sticking between formed or molded products or pellets can be suppressed.

BACKGROUND OF THE INVENTION

Polyesters typified by polyethylene terephthalate (PET) are excellent in transparency and mechanical properties, and accordingly are widely used as materials for bottles and sheets. A polyester is usually obtained by performing an esterification and/or transesterification reaction between a dicarboxylic acid component and a diol component, and then performing a polycondensation reaction while taking out the diol component out of the reaction system under reduced pressure.

For example, by using a terephthalic acid component and an ethylene glycol component or a 1,4-butanediol component, a homopolymer of PET or polybutylene terephthalate (PBT) is obtained; however, by adding a dicarboxylic acid component and/or a diol component other than these monomer components constituting PET or PBT, a copolymerized polyester having various properties can be obtained. In particular, flexibility can be imparted by copolymerizing polyoxytetramethylene glycol with a polyester such as PET or PBT, and by further copolymerizing another monomer with this copolymer and making the polyester amorphous, a soft copolymerized polyester similar to a soft vinyl chloride resin can be obtained (see, for example, Patent Literature 1 to Patent Literature 3).

However, because the glass transition temperature (Tg) of such an amorphous soft copolymerized polyester is often room temperature, namely, 25° C. or lower, when the amorphous soft copolymerized polyester is formed or molded and exposed to a temperature of Tg or higher over a long term, there has occurred a problem that the bleeding-out of the oligomer occurs in the soft polyester resin, and a portion of the oligomer turns into fine crystals, leading to loss in the transparency and surface gloss of formed or molded products. In addition, the amorphous resin has a reduced heat resistance, and as a result, there has been another problem that the formed or molded products or pellets for forming or molding are liable to stick to each other.

In contrast, for example, in Patent Literature 4, it was reported that the bleeding-out of the oligomers is reduced by further copolymerizing 5-sodium sulfoisophthalic acid or a diester derivative thereof with a polyester resin in which polyoxytetramethylene glycol is copolymerized. However, the method of Patent Literature 4 can provide a polyester resin in which the bleeding-out over time is reduced, but the resulting polyester resin is insufficient in heat resistance, and therefore, the problem of sticking between formed or molded products or pellets has not been solved.

CITATION LIST

Patent Literature

Patent Literature 1: Japanese Patent No. 3270185
Patent Literature 2: Japanese Patent Laid-Open No. 2000-302888
Patent Literature 3: Japanese Patent Laid-Open No. 2002-363271
Patent Literature 4: Japanese Patent No. 4764054

DISCLOSURE OF THE INVENTION

Problem to be Solved by the Invention

The present invention has been made in order to solve the problem, and an object of the present invention is to provide a polyester resin composition that is excellent in transparency and flexibility, and high in heat resistance, in which the bleeding-out of the oligomer is suppressed to a low level, and additionally and in which sticking between formed or molded products or pellets rarely occurs.

Means to Solve the Problem

As a result of the inventors' diligent study in view of the problems of conventional techniques, the present inventors have found that a polyester resin obtained by copolymerizing a polyester mainly composed of an alicyclic dicarboxylic acid and an alicyclic diol with 2 to 25 mol % of a dimer acid has an excellent transparency even after crystallization, excellent flexibility, and high heat resistance, in which the bleeding-out of the oligomer is suppressed to a low level, and, additionally, sticking between formed or molded products or pellets hardly occurs, and that the resin satisfies all these demands, and finally has achieved the present invention.

That is, the polyester resin composition according to the present invention includes a polyester resin produced by a polymerization reaction of a dicarboxylic component containing (a) 75 to 98 mol % of an alicyclic dicarboxylic acid and (b) 2 to 25 mol % of a dimer acid with (c) a diol component containing 75 mol % or more of an alicyclic diol.

In addition, in the polyester resin composition, (a) the alicyclic dicarboxylic acid is preferably an alicyclic dicarboxylic acid having 5 to 30 carbon atoms.

In addition, in the polyester resin composition, the ratio of the trans-form relative to the total amount of the trans-form and the cis-form of (a) the alicyclic dicarboxylic acid unit contained in the polyester resin composition is desirably 80% or more.

In addition, in the polyester resin composition, (b) the dimer acid is preferably a dimer acid having 36 or 44 carbon atoms.

Effect of the Invention

The polyester resin composition according to the present invention has excellent transparency and flexibility, and high heat resistance, the bleeding-out of the oligomer is suppressed to a low level, and additionally sticking between formed or molded products or pellets hardly occurs.

DESCRIPTION OF THE PREFERRED EMBODIMENT

Hereinafter, the embodiment of the present invention is described in detail, but the present invention is not limited to these contents as long as the description does not deviate from the gist of the present invention.

The polyester resin composition of the present invention includes a polyester resin prepared by performing a polymerization reaction of a dicarboxylic component containing (a) 75 to 98 mol % of an alicyclic dicarboxylic acid and (b) 2 to 25 mol % of a dimer acid with (c) a diol component containing 75 mol % or more of an alicyclic diol.

Dicarboxylic Acid Component (a) Alicyclic Dicarboxylic Acid (a) The alicyclic dicarboxylic acid is a compound having an alicyclic structure such as a monocyclic cycloalkane such as cyclopentane, cyclohexane, cycloheptane, or cyclooctane or a bicyclic alkane such as decahydronaphthalene (decalin), and two carboxyl groups. Examples of the alicyclic dicarboxylic acid used in the present invention may include 1,2-, 1,3-, and 1,4-cyclohexanedicarboxylic acids, and 1,4-, 1,5-, 2,6-, and 2,7-decahydronaphthalene dicarboxylic acids. Among these, the use of 1,4-cyclohexanedicarboxylic acid is preferable, because the forming or molding temperature of the obtained polyester is close to the conventional forming or molding temperature, and 1,4-cyclohexanedicarboxylic acid is industrially easily available.

In addition, (a) the alicyclic dicarboxylic acid may be an unsubstituted compound or a derivative such as an alkyl ester. Examples of the alkyl ester derivative include an alkyl ester having 1 to 10 carbon atoms, more specifically a dimethyl ester and a diethyl ester; in particular, a dimethyl ester can be suitably used. It is to be noted that, without being particularly limited, when an unsubstituted alicyclic dicarboxylic acid is used as a polymerization raw material, and the polymerization is performed on the basis of a direct esterification, the isomerization from the trans-form to the cis-form tends to occur during polymerization reaction, and it is difficult to control the proportion of the trans-form contained in the resin so as to be 80% or more. Accordingly, it is particularly desirable to use an alkyl ester as an alicyclic dicarboxylic acid.

In the polyester resin composition of the present invention, the content of (a) the alicyclic dicarboxylic acid is 75 to 98 mol % in the total amount of the dicarboxylic acid component. In addition, the content of (a) the alicyclic dicarboxylic acid is more preferably 80 to 90 mol % in the total amount of the dicarboxylic acid component. When the content of (a) the alicyclic dicarboxylic acid is less than 75 mol %, the crystallization rate of the polymer is decreased and the polyester composition is poor in forming or molding processability. It is to be noted that when a component other than (a) the alicyclic dicarboxylic acid such as an aromatic dicarboxylic acid is used as the main component of the dicarboxylic acid, whitening occurs with an elapse of time, or the transparency is not sufficiently achieved.

The proportion of the trans-form in relation to the total content of the trans-form and the cis-form of (a) the alicyclic dicarboxylic acid unit contained in the polyester resin composition of the present invention is desirably 80% or more, and further desirably 90% or more. When the proportion of the trans-form is less than 80%, the melting point of the polymer is decreased, accordingly the heat resistance is decreased, the crystallinity balance is destroyed, the transparency after crystallization is hardly maintained, and accordingly the polyester resin composition is sometimes poor in transparency, or the whitening of the polyester resin composition with the elapse of time sometimes occurs. It is to be noted that the higher the proportion of the trans-form, the higher the heat resistance of the obtained resin; however, the isomerization from the trans-form to the cis-form occurs in the polymerization step, and therefore, for example, it is usually difficult for the resin after polymerization to achieve the proportion of the trans-form exceeding 95%.

In addition, in the (a) alicyclic dicarboxylic acid used as a polymerization raw material, the isomer ratio between the trans-form and the cis-form, trans-form/cis-form, is preferably 90/10 to 100/0, and more preferably 95/5 to 100/0. In consideration of the isomerization from the trans-form to the cis-form in the polymerization step, when the proportion of the trans-form is less than 90%, it is difficult to control the proportion of the trans-form contained in the resin so as to be 80% or more.

(b) Dimer Acid (b) A dimer acid is a dicarboxylic acid compound obtained by dimerizing an unsaturated fatty acid having 10 to 30 carbon atoms; for example, (b) a dimer acid is a dimerized dicarboxylic acid, having 36 or 44 carbon atoms, obtained by dimerizing an unsaturated fatty acid having 18 carbon atoms such as oleic acid or linoleic acid, or an unsaturated fatty acid having 22 carbon atoms such as erucic acid, or an ester-forming derivative of the dimer acid. The dimer acid obtained by hydrogenation to saturate the unsaturated double bonds remaining after the dimerization is referred to as the hydrogenated dimer acid; the hydrogenated dimer acid can be suitably used from the viewpoint of reaction stability, flexibility, impact resistance, or the like. It is to be noted that the (b) dimer acid is usually obtained as a mixture of linear and branched structure compounds and compounds having alicyclic structures and the like, the contents of these compounds are different depending on the production process thereof, and the contents of these compounds are not particularly limited.

In the polyester resin composition of the present invention, the content of (b) the dimer acid is 2 to 25 mol % in the total amount of the dicarboxylic acid component. In addition, the content of (b) the dimer acid is more preferably 10 to 20 mol % in the total amount of the dicarboxylic acid component. When the content of (b) the dimer acid falls outside the range from 2 to 25 mol %, the balance of the crystallization of the polymer is destroyed, and it is difficult to achieve a high transparency even after the crystallization occurs. Moreover, when the content of (b) the dimer acid is less than 2 mol %, the flexibility of the polymer is poor; when the content of (b) the dimer acid exceeds 25 mol %, the crystallization rate of the polymer is slow, and accordingly the polyester resin composition tends to be poor in forming or molding properties.

Others

It is to be noted that in the polyester resin composition of the present invention, a dicarboxylic acid component(s) other than (a) the alicyclic dicarboxyhc acid and (b) the dimer acid may be used as a polymerization raw material in an appropriate amount; examples of such a dicarboxylic acid component may include: aromatic dicarboxylic acids such as terephthalic acid, isophthaiic acid, 2.6-naphthalene dicarboxylic acid, 1,4-naphthalene dicarboxylic acid, and 4,4'-diphenyldicarboxvlic acid; and aliphatic dicarboxylic acids such as succinic acid, glutaric acid, adipic acid, pimelic acid, suberic acid, azelaic acid, and sebacic acid. It is to be noted that these dicarboxylic acid components may be used each alone or in combinations of two or more thereof.

Diol Component (c) Alicyclic Diol (c) The alicyclic diol is a compound having a alicyclic structure such as a monocyclic cycloalkane or a bicyclic alkane and two hydroxyl groups; examples of the alicyclic diol may include: 5-membered ring diols such as 1,2-, 1,3-cyclopentanediol, 1,2-, 1,3-cyclopentanedimethanol, and bis(hydroxymethy)tricyclo[5.2.1.0] decane; and 6-membered ring diols such as 1,2-, 1,3-, 1,4-cyclocyclohexanediol, 1,2-, 1,3-, 1,4-cyclocyclohexanedimethanol, and 2,2-bis-(4-hydroxycyclohexyl)-propane. Among these, 1,2-, 1,3-, and 1,4-cyclocyclohexanedimethanol are preferable; in particular, 1,4-cyclohexanedimethanol has methylol groups at the para-positions, is high in reactivity, allows a polyester having a high degree of polymerization to be easily obtained, and accordingly can be used suitably. It is to be noted that 1,4-cyclohexanedimethanol is usually a mixture composed of a trans-form and a cis-form; the ratio of trans-form/cis-form of 1,4-cyclohexanedimethanol to be used as a polymerization raw material is not particularly limited, but is preferably 80/20 to 60/40, and more preferably 75/25 to 70/30.

In the polyester resin composition of the present invention, the content of (c) the alicyclic diol is 75 mol % or more in the total amount of the diol component. In addition, the content of (c) the alicyclic diol is more preferably 85 mol % or more in the total amount of the dicarboxylic acid component, and (c) the alicyclic diol may account for the total amount of the diol component. When the content of (c) the alicyclic diol is less than 75 mol %, since the heat resistance of the polymer is poor, sticking between formed or molded products or pellets tends to occur, and the crystallization rate becomes slow, and therefore the polyester resin composition is poor in forming or molding processability.

Others

A diol component other than (c) the alicyclic diol may be used within a range of less than 25 mol % in the total amount of the diol component. Examples of the diol component other than (c) the alicyclic diol may include: ethylene glycol, propylene glycol, butanediol, hexanediol, octanediol, and decanediol; or ethylene oxide adducts of bisphenol A, bisphenol S and the like; and trimethylolpropane; these may be used each alone or in combinations of two or more thereof.

Method for Producing Polyester Resin Composition

The method for producing the polyester resin composition of the present invention is not particularly limited; the polymerization reaction between the dicarboxylic acid component and the diol component can be performed by using a heretofore known catalyst with a heretofore known method. The method for producing the polyester resin composition of the present invention may be either a method in which an unsubstituted dicarboxylic acid is used as a starting material, and a direct esterification is performed or a method in which an esterified product such as a dimethyl ester is used as a starting material, and a transesterification reaction is performed; however, in a direct esterification using (a) an unsubstituted alicyclic dicarboxylic acid, the isomerization from the trans-form to the cis-form tends to occur during the polymerization reaction, and it is difficult to control the proportion of the trans-form so as to be 80% or more; accordingly, it is preferred to perform a transesterification reaction using an esterified product of (a) the alicyclic dicarboxylic acid. More specifically, a transesterification reaction and an esterification reaction are performed by using heretofore known catalyst under ordinary pressure, and then, further a polymerization reaction is desirably successively performed by using a heretofore known catalyst under a reduced pressure.

When the respective (a) to (c) components as the polymerization raw materials are allowed to react, the diol component is used by appropriately regulating the amount of the diol component in such a way that the molar ratio of the whole diol component/the whole dicarboxylic acid component in the raw materials falls within a range desirably from 0.8 to 1.5, and more preferably from 0.9 to 1.3. When the molar ratio exceeds 1.5, in (a) the alicyclic dicarboxylic acid, the isomerization from the trans-form to the cis-form tends to occur, the proportion of the trans-form contained in the resin after polymerization is decreased, and the resin after polymerization is sometimes poor in heat resistance. In addition, when the molar ratio is less than 0.8, the transesterification reaction does not proceed smoothly, the molecular weight of the obtained resin is small, and sometimes sufficient mechanical properties are not achieved to an actually usable degree.

As the catalyst for the transesterification reaction, it is preferred to use at least one or more metal compounds; examples of the preferable metal element may include: sodium, potassium, calcium, titanium, lithium, magnesium, manganese, zinc, tin, and cobalt. Among these, the titanium and manganese compounds are preferable because of being high in reactivity, and giving good color tones to the obtained resin. The amount used of the transesterification catalyst is usually 5 to 1000 ppm, and preferably 10 to 100 ppm in relation to the produced polyester resin.

The transesterification reaction is performed, for example, as follows: the individual components used as the polymerization raw materials and various other copolymerization components used if necessary are placed in a reaction tank equipped with a heating unit, a stirrer and a distillation tube, a reaction catalyst is added to the resulting mixture, the mixture is increased in temperature while being stirred in an inert gas atmosphere at ordinary pressure, and the reaction is allowed to proceed while the by-products produced by the reaction, such as methanol, are being distilled off The reaction temperature is 150° C. to 270° C., and preferably 160° C. to 260° C., and the reaction time is usually approximately 3 to 7 hours.

In addition, after the transesterification reaction is completed, a phosphorus compound in a molar amount equal to or larger than the molar amount of the transesterification catalyst is added, and the esterification reaction is desirably allowed to further proceed, in the present invention, it is desirable to produce the polyester resin including the (a) to (c) respective components, for example, by first performing the transesterification reaction by using (a) the ester compound of the alicyclic dicarboxylic acid and (c) the alicyclic diol, and by subsequently allowing the esterification reaction to proceed under the condition that further (b) the dimer acid is added together with a phosphorus compound. Examples of the phosphorus compound may include: phosphoric acid. phosphorous acid, trimethyl phosphate, triethyl phosphate, tributyl phosphate, trimethyl phosphite, triethyl phosphite, and tributyl phosphite. Among these, trimethyl phosphate is particularly preferable. The amount used of the phosphorus compound is usually 5 to 1000 ppm, and preferably 20 to 100 ppm, in relation to the produced polyester resin.

In addition, subsequently to the transesterification reaction and the esterification reaction, a polycondensation reaction is performed until a desired molecular weight is achieved. As a catalyst of the polycondensation reaction, it is desirable to use at least one or more metal compounds. Examples of the preferable metal element may include titanium, germanium, antimony, and aluminum. Among these, a titanium compound and a germanium compound are particularly desirable because of being high in reactivity and being excellent in the transparency of the obtained resin. The amount used of the polymerization catalyst is usually 30 to 1000 ppm, and preferably 50 to 500 ppm, in relation to the produced polyester resin.

The polycondensation reaction is performed, for example, as follows: after the polycondensation reaction catalyst is added in a reaction tank having as placed therein the product after the completion of the transesterification reaction and the esterification reaction, the polycondensation reaction is performed while gradually increasing a temperature and reducing pressure inside the reaction tank. The pressure inside the tank is reduced from the normal pressure of the atmosphere finally to 0.4 kPa or less, and preferably to 0.2 kPa or less. The temperature inside the tank is increased from 220-230° C. to, finally, 250 to 290° C., preferably 260-270° C., and after the predetermined torque is reached, the reaction product is extruded from the tank bottom to be collected. In a usual case, the reaction product is extruded in a strand shape into water, the strand is cooled and then subjected to cutting, and thus a polyester resin in a pellet shape can be obtained.

To the polyester resin composition of the present invention, according to the intended application or the intended forming or molding, it is possible to appropriately add various additives such as an antioxidant, a heat stabilizer, a lubricant, an antistatic agent, a plasticizer, an ultraviolet absorber, and a pigment. In addition, these additive components may also be mixed in either of the polymerization reaction step and the processing/forming or molding step. Examples of the antioxidant may include a hindered phenol-based antioxidant, a phosphorus-based antioxidant, and a sulfur-based antioxidant; in particular, a hindered phenol-based antioxidant can be suitably used, and the content thereof is desirably approximately 100 to 5000 ppm. In addition, when a melt extrusion film is formed, in order to stabilize the electrostatic adhesiveness of the cooling roll, a metal salt such as magnesium acetate, calcium acetate, or magnesium chloride may be added.

The polyester resin composition of the present invention is excellent in flexibility and transparency, high in heat resistance, additionally bleeding-out and sticking between formed or molded products or pellets hardly occur, and the polyester resin composition is excellent in stability over time and forming or molding processability, and accordingly the polyester resin composition of the present invention can be used widely, as various forming or molding materials such as materials for electrical and electronic components and materials for automobiles.

In the polyester resin according to the present invention, the reaction product between the alicyclic dicarboxylic acid and the alicyclic diol is faster in crystallization rate than PET, and slower in crystallization rate than PBT. In addition, by further copolymerizing the dimer acid with this composition, flexibility is imparted, the crystallization rate is regulated, and the thermal properties are improved. In addition, in the polyester according to the present invention, fine crystals having the size of visible light wavelength or less are formed, and accordingly a resin excellent in transparency even after undergoing crystallization is obtained.

EXAMPLES

Hereinafter, the contents of the present invention are described in further detail by way of Examples, but the present invention is not limited to following Examples as long as the present invention does not deviate from the gist of the present invention. It is to be noted that the methods used in Examples and Comparative Examples are as follows.

(1) Proportion of Trans-Form of Alicyclic Dicarboxylic Acid in Polyester Resin Composition In deuterated chloroform containing 50 vol.% of trifluoroacetic acid, 30 to 50 mg of the polyester resin composition was dissolved, the resulting solution was measured with a 400-MHz 1H-NMR measurement apparatus (manufactured by Bruker), and from the obtained NMR spectrum, the proportion of the trans-form was calculated.

(2) Glass Transition Temperature (Tg), Crystallization Temperature (Tc) and Melting Point (Tm).

Tg, Tc and Tm were determined from the DSC curve measured by using 10 mg of the polyester resin composition with a differential scanning calorimeter DSC (DSC7, manufactured by Perkin-Elmer Corporation) at a temperature rising rate of 10° C./min, respectively.

It is to be noted that in the present invention, preferably
$Tg \leq 25°$ C. from the viewpoint of the flexibility,
$Tm \geq 150°$ C. from the viewpoint of the heat resistance, and
$Tc \leq 100°$ C. from the viewpoint of performing the regulation of the crystallization rate.

(3) Haze

A plate (thickness: 2 mm) of the polyester resin composition was molded by using an injection molding machine (J150SA, manufactured by The Japan Steel Works, Ltd.) under the condition of a resin temperature of 260° C., and the haze of the plate was measured by using a haze meter (NDH4000, manufactured by Nippon Denshoku Industries Co., Ltd.).

(4) Modulus of Elasticity

A specimen (according to ISO527-2, 1A) of the polyester resin composition was molded by using an injection molding machine (J150SA, manufactured by The Japan Steel Works, Ltd.) under the condition of a resin temperature of 260° C., and the modulus of elasticity of the specimen was measured by using a Tensilon universal tester (UCT-2.5T, manufactured by TS Engineering Co., Ltd.).

From the viewpoint of the flexibility, the modulus of elasticity is preferably 300 MPa or less.

(5) Sticking Test Under Load

In a cylindrical vessel of 55 mm in inner diameter and 37 mm in height, the pellets of the polyester resin composition were placed, a load of 5 kg was applied from above, the vessel was held in an oven heated to 100° C. for 3 hours, and then the exterior appearance of the resin was observed and the presence or absence of the sticking was checked.

(6) Bleeding-Out Property

A plate (thickness: 2 mm) of the polyester resin composition was molded by using an injection molding machine (J150SA, manufactured by The Japan Steel Works, Ltd.) under the condition of a resin temperature of 260° C., the obtained plate was allowed to stand still in an oven at 60° C. for 1 week, and then the presence or absence of the precipitation of the oligomer on the plate surface was checked.

The present inventors produced the polyester resins of following Examples and Comparative Examples, and evaluated the various physical properties of the resins by using the above-described methods. The raw material compositions of the polyester resins of Examples and Comparative Examples, and the evaluation results of the physical properties of the obtained resins are collectively shown in Tables 1 and 2.

Example 1

In a reactor equipped with a stirrer, a distillation tube and a pressure reducing apparatus, 12.90 kg of (a) dimethyl 1,4-cyclohexanedicarboxylate (DMCD, trans-form proportion: 98%), 11.47 kg of (c)1,4-cyclohexanedimethanol (CHDM), 0.3 kg of ethylene glycol (EG), and 0.11 kg of a 10% EG solution of Mn acetate tetrahydrate were placed, and the resulting mixture was heated to 200° C. in a flow of nitrogen, and then the temperature was increased to 230° C. over 1 hour. The mixture was maintained as it was for 2 hours to perform the transesterification reaction, then 10.30 kg of (b) a dimer acid derived from erucic acid (the number of carbon atoms: 22, PRIPOL1004, manufactured by Croda International Plc), and 0.11 kg of a 10% EG solution of trimethyl phosphate were placed in the reaction system, and successively, the mixture was allowed to undergo esterification reaction at 230° C. for 1 hour. Subsequently, 300 ppm of germanium dioxide was added as a polycondensation catalyst to the reaction mixture and stirred, then the internal pressure was reduced to 133 Pa or less over 1 hour, meanwhile the internal temperature was increased from 230° C. to 270° C., and the polycondensation reaction was performed with stirred under a high vacuum of 133 Pa or less until a predetermined viscosity was reached. The obtained polymer was extruded in a strand shape into water, and the strand was cut into a pellet shape. The thermal physical properties, haze, light transmittance, modulus of elasticity and composition of the obtained polyester resins are as shown in Table 1.

Examples 2 to 7

The pellet-shaped polymers of Examples 2 to 7 were produced in the same manner as in Example 1 except that the polymer compositions were altered as described in Table 1, and each physical property of the obtained polymers was evaluated.

Comparative Example 1

In a reactor equipped with a stirrer, a distillation tube and a pressure reducing apparatus, 8.86 kg of an oligomer having a molar ratio of ethylene glycol to terephthalic acid of 1.10 was placed, and was melted while the internal temperature was being increased to 240° C. Subsequently, 1.46 kg of 1,4-cyclohexanedimethanol and 0.01 kg of trimethylolpropane were placed in the reactor, the internal temperature was increased to 250° C., and the resulting mixture was stirred as it was for 60 minutes. In the reactor, 2.79 kg of polyoxytetramethylene glycol having a number average molecular weight of 1000, and 0.3 kg of tetrakis[methylene-3-(3',5'-di-t-butyl-4-hydroxyphenyl)propionate]methane as a thermal stabilizer were placed. After the internal temperature reached 250° C., 300 ppm of germanium dioxide as a polymerization catalyst, and 60 ppm of triethyl phosphate as the phosphorus element were added to the reactor and stirred, then the internal pressure was reduced to 133 Pa or less over 1 hour, and meanwhile the internal temperature was increased to 260° C. The polycondensation reaction was performed with stirred under a high vacuum of 133 Pa or less until a predetermined viscosity was reached, the obtained polyester was extruded in a code-like shape from a mouthpiece into water, and cut with a pelletizer, to yield a pellet-shaped polymer. The physical properties of the obtained polyester resin were evaluated in the same manner as in Example 1.

Comparative Examples 2 to 7

The pellet-shaped polymers of Comparative Examples 2 to 7 were produced in the same manner as in Comparative Example 1 except that the polymer compositions were altered as described in Table 2, and each physical property of the obtained polymers was evaluated.

TABLE 1

|  | Example 1 | Example 2 | Example 3 | Example 4 | Example 5 | Example 6 | Example 7 |
| --- | --- | --- | --- | --- | --- | --- | --- |
| Dimethyl 1,4-cyclohexanedicarboxylate (DMCD; mol %) | 81 | 84 | 76 | 92 | 81 | 84 | 85.8 |
| Dimer acid derived from erucic acid (mol %) | 19 | 16 | 24 | 8 | 19 | — | 14.2 |
| Dimer acid derived from oleic acid (mol %) | — | — | — | — | — | 16 | — |
| 1,4-Cyclohexanedimethanol (CHDM; mol %) | 100 | 100 | 100 | 100 | 80 | 100 | 100 |
| Ethylene glycol (EG; mol %) | — | — | — | — | 20 | — | — |
| Proportion of trans-form of DMCD (%) | 92.1 | 93.3 | 91.1 | 93.5 | 94.0 | 92.3 | 75.2 |
| Tg(° C.) | −7.9 | −1.1 | −19.9 | 22.5 | — | — | — |
| Tc(° C.) | 38.7 | 38.5 | 35.0 | 85.2 | 42.5 | 37.0 | 72.1 |
| Tm (° C.) | 178.7 | 197.0 | 170.3 | 219.8 | 156.3 | 180.9 | 130.0 |
| Haze (%) | 3.0 | 1.0 | 13.8 | 0.6 | 1.0 | 2.0 | 11.5 |
| Tensile modulus of elasticity (MPa) | 76.2 | 77.1 | 48.7 | 112.2 | 50.3 | 82.3 | 36.6 |

TABLE 1-continued

|  |  | Example 1 | Example 2 | Example 3 | Example 4 | Example 5 | Example 6 | Example 7 |
|---|---|---|---|---|---|---|---|---|
| Sticking test under load | Occurrence/no occurrence of sticking | Non-occurrence | Non-occurrence | Non-occurrence | Non-occurrence | Non-occurrence | Non-occurrence | Non-occurrence |
|  | Exterior appearance of resin | Colorless and transparent | Colorless and transparent | Colorless and transparent | Colorless and transparent | Colorless and transparent | Colorless and transparent | Translucent |
| Bleeding-out at 60° C., for 1 week |  | Non-occurrence | Non-occurrence | Non-occurrence | Non-occurrence | Non-occurrence | Non-occurrence | Non-occurrence |

TABLE 2

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Terephthalic acid (mol %.) | 100.0 | 99.0 | 84.3 | — | — | — | — |
| 5-Sodium sulfoisophthalic acid bis(2-hydroxyethylether) (mol %) | — | 1.0 | — | — | — | — | — |
| Dimethyl 1,4-cyclohexane-dicarboxylate (mol %) | — | — | — | 85.8 | 99 | 72 | 81 |
| Dimer acid derived from erucic acid (mol %) | — | — | 15.7 | 14.2 | 1 | 28 | 19 |
| Ethylene glycol (mol %) | 63.4 | 63.4 | — | — | — | — | 40 |
| 1,4-Butanediol(mol %) | — | — | — | 100 | — | — | — |
| 1,4-Cyclohexanedimethanol (mol %) | 30 | 30 | 100 | — | 100 | 100 | 60 |
| Trimethylolpropane (mol %) | 0.2 | 0.2 | — | — | — | — | — |
| Polyoxy-tetramethyleneglycol (Number average molecular weight: 1000, mol %) | 6.4 | 6.4 | — | — | — | — | — |
| Proportion of trans-form of DMCD (%) | — | — | — | 91.5 | 92.1 | 90.8 | 91.1 |
| Tg(° C.) | 24.5 | 23.5 | 31.1 | — | 57.3 | — | — |
| Tc(° C.) | — | — | 98.7 | — | 99.9 | 23.9 | — |
| Tm(° C.) | — | — | 231.7 | 139.2 | 228.9 | 152.6 | — |
| Haze (%) | 2.8 | 2.9 | 10.1 | 93.5 | 1.5 | 25.1 | Impossible to be molded |
| Tensile modulus of elasticity (MPa) | 54.9 | 56.1 | 312 | 59.7 | 1011.7 | 49.5 | Impossible to be molded |
| Sticking test under load | Occurrence | Occurrence | Occurrence | Non-occurrence | Non-occurrence | Non-occurrence | Non-occurrence | Occurrence |
|  | Colorless and transparent | Colorless and transparent | Colorless and transparent | Somewhat whitened | White | Whitened | Translucent | Colorless and transparent |
| Bleeding-out at 60° C., for 1 week | Occurrence | Non-occurrence | Non-occurrence | Non-occurrence | Non-occurrence | Non-occurrence | Impossible to be molded |

As shown In Table 1, the polyester resins of Examples 1 to 4 produced by using as the dicarboxylic acid component, 76 to 92 mol % of (a) dimethyl 1,4-cyclohexanedicarboxylate, and 24 to 8 mol % of (b) the dimer acid derived from erucic acid (the number of carbon atoms: 44), and as the diol component, (c) 1,4-cyclohexanedimethanol were excellent in heat resistance (Tg, Tc, Tm), and good in transparency (haze) and flexibility (tensile modulus of elasticity), sticking did not occur even after the application of a load and heat, good transparency of the exterior appearance was maintained in spite of being crystallized, and further, the bleeding-out of the oligomer did not occur at all even after being maintained at 60° C. for 1 week. In both the polyester resin of Example 5 using, as the diol component, 20 mol % of ethylene glycol in addition to (c) cyclohexanedimethanol, and the polyester resin of Example 6 using, as (b) the dimer acid, the dimer acid (the number of carbon atoms: 36) derived from oleic acid, good results like Examples 1 to 4 were obtained in any of the evaluations. It is to be noted that in the polyester resin of Example 7 in which (a) 1,4-cyclohexanedicarboxylic acid (DMCD) of the polymerization raw material was altered so as to give the trans-form proportion of 75.2% after polymerization, the exterior appearance of the resin was translucent in the sticking test under load, the transparency with time tended to be somewhat poor, but the other evaluations were all good.

In contrast, as shown in Table 2, the soft polyester resin of Comparative Example 1 composed of a PET resin copolymerized with cyclohexanedimethanol or polyoxytetramethylene glycol had a low Tg, accordingly the bleeding-out of the oligomer occurred with time, and additionally, the soft polyester resin of Comparative Example 1 was amorphous, so that the sticking of the pellets under load occurred. In the soft polyester resin of Comparative Example 2 in which a sodium sulfoisophthalate derivative was further added and copolymerized to the polyester composition of Comparative Example 1, although the bleeding-out of the oligomer was prevented, the sticking between pellets still occurred under load.

In addition, the polyester resin of Comparative Example 3 using, as the dicarboxylic acid component, an aromatic dicarboxylic acid (terephthalic acid) and (b) the dimer acid underwent the occurrence of somewhat whitening due to crystallization in the sticking test under load. The polyester resin of Comparative Example 4 using as the diol component only an aliphatic glycol (1,4-butanediol) underwent whitening due to crystallization immediately after the extrusion, and did not allow a sufficient transparency (haze) to be achieved. The polyester resin of Comparative Example 5 in which the content of (b) the dimer acid was set to be 1 mol % underwent excessive hardening of the resin, had an insufficient flexibility (tensile modulus of elasticity), and additionally underwent the occurrence of whitening in the sticking test under load. On the other hand, the polyester resin of Comparative Example 6 in which the content of (b)

the dimer acid was set to be 28 mol % did not have a sufficient transparency (haze). The polyester resin of Comparative Example 7 using as the diol component 60 mol % of (c) 1,4-cyclohexanedimethanol and 40 mol % of ethylene glycol did not allow a specimen to be molded, and additionally underwent the occurrence of the sticking of the pellets in the sticking test under load.

What is claimed is:

1. A polyester resin composition comprising: a polyester resin,
    the polyester resin being made by performing a polymerization reaction of:
    a dicarboxylic acid component containing (a) 75 to 98 mol% of an alicyclic dicarboxylic acid and (b) 2 to 25 mol% of a dimer acid having 44 carbon atoms; and
    (c) a diol component containing 75 mol% or more of an alicyclic diol.

2. The polyester resin composition according to claim 1, wherein (a) the alicyclic dicarboxylic acid is an alicyclic dicarboxylic acid having 5 to 30 carbon atoms.

3. The polyester resin composition according to claim 1, wherein the proportion of the trans-form relative to the total amount of the trans-form and the cis-form of (a) the alicyclic dicarboxylic acid unit contained in the polyester resin composition is 80% or more.

4. The polyester resin composition according to claim 2, wherein the proportion of the trans-form relative to the total amount of the trans-form and the cis-form of (a) the alicyclic dicarboxylic acid unit contained in the polyester resin composition is 80% or more.

* * * * *